(12) United States Patent
Sakita

(10) Patent No.: US 8,235,074 B2  
(45) Date of Patent: Aug. 7, 2012

(54) POPE AND PIPE FITTINGS

(76) Inventor: Masami Sakita, San Francisco, CA (US)

( * ) Notice: Subject to any disclaimer, the term of this patent is extended or adjusted under 35 U.S.C. 154(b) by 325 days.

(21) Appl. No.: 12/660,366

(22) Filed: Feb. 25, 2010

(65) Prior Publication Data

US 2011/0203696 A1 Aug. 25, 2011

(51) Int. Cl.  
*E03B 7/10* (2006.01)

(52) U.S. Cl. ............. 138/28; 138/32; 138/118; 138/177

(58) Field of Classification Search ............. 138/27, 138/28, 32, 118, 177  
See application file for complete search history.

(56) References Cited

U.S. PATENT DOCUMENTS

| | | | | |
|---|---|---|---|---|
| 1,304,036 A | * | 5/1919 | Eshelby | 138/28 |
| 3,601,128 A | * | 8/1971 | Hakim | 604/9 |
| 3,878,867 A | * | 4/1975 | Dirks | 138/30 |
| 4,020,639 A | | 5/1977 | Nagare et al. | |
| 4,651,781 A | * | 3/1987 | Kandelman | 138/30 |
| 5,111,848 A | * | 5/1992 | Inukai | 138/30 |
| 5,718,952 A | * | 2/1998 | Zimmermann et al. | 428/34.1 |
| 5,797,416 A | * | 8/1998 | Wilcox | 137/60 |
| 6,119,729 A | * | 9/2000 | Oberholzer et al. | 138/27 |
| 6,314,942 B1 | * | 11/2001 | Kilgore et al. | 123/467 |
| 7,497,202 B2 | * | 3/2009 | Cvengros et al. | 123/456 |
| 7,921,882 B2 | * | 4/2011 | Gebhardt | 138/30 |

\* cited by examiner

*Primary Examiner* — Patrick F Brinson

(57) ABSTRACT

The pipe has a non-circular cross section that generally looks like that of a squashed circle. The pipe would not deform significantly from that having the squashed circle cross section under the condition in which the inside pressure is the same or less than that of the internal pressure of the pipe that carries ordinary cold tap water. The cross section of the pipe gets deformed to become rounder and larger when the water within the pipe is frozen, and the rounder and larger cross section is large enough for the pipe to contain the frozen water or ice without having any damages. The pipe is made of material such as high carbon content steel that allows the pipe to change its shape back to the pre-frozen shape as the water inside is thawed out.

11 Claims, 6 Drawing Sheets

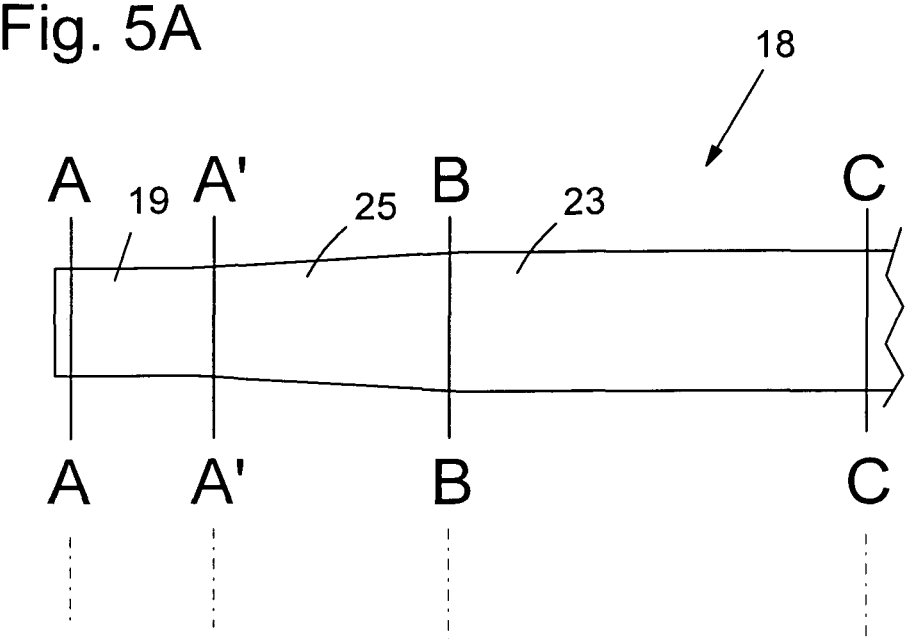
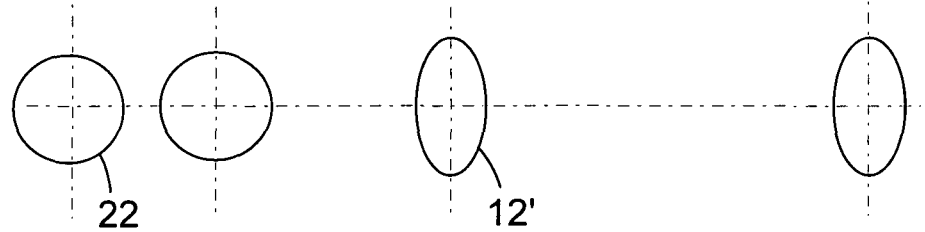

29

POPE AND PIPE FITTINGS

FIELD OF THE INVENTION

This invention relates generally to a pipe or tube (hereinafter refer to as "a pipe") and pipe or tube fittings (hereinafter refer to as "pipe fittings"), and more particularly that may be used in the cold climate area.

BACKGROUND OF THE INVENTION

A broken pipe due to freezing of the water in a pipe is a common problem in winter in the very cold climate area. Available methods to alleviate this problem are burying the main pipe deep under the ground, and insulating or heating the pipe in the home. Obviously these methods are not able to fully solve the problem. A better way to alleviate the problem is needed.

OBJECTS OF THE INVENTION

An object of this invention is the provision of a pipe and pipe fittings that will not get damaged even if the water inside the pipe is frozen year after year under subfreezing climate conditions in winter.

SUMMARY OF THE INVENTION

The preferred embodiment of the pipe of the present invention has a non-circular cross section that generally looks like a squashed circle. The pipe does not deform significantly from that having the squashed circle cross section under the condition in which the pressure inside the pipe is the same or less than that of the internal pressure of the pipe that carries ordinary cold tap water.

The pipe that has the squashed circle like cross section gets deformed and its cross section becomes rounder (in the pipe that carries water inside) and larger as the water within the pipe is frozen, wherein the rounder and larger cross section is large enough to contain the frozen water (or ice) inside without having damages. The pipe is able to change its shape back to generally the original pre-frozen state of the squashed circle like non-circular cross section as the water inside is thawed out.

BRIEF DESCRIPTION OF THE DRAWINGS

The above description and other objects and advantages of this invention will become more clearly understood from the following description when considered with the accompanying drawings. It should be understood that the drawings are for purposes of illustration only and not by way of limitation of the invention. In the drawings, like reference characters refer to the same parts in the several views:

FIG. 5A a top view, and FIG. 5B cross-sectional views taken at three locations along its length of Alternative Embodiment A of the pipe of the present invention;

DETAILED DESCRIPTION OF THE INVENTION

Preferred Embodiment

Figure 1:
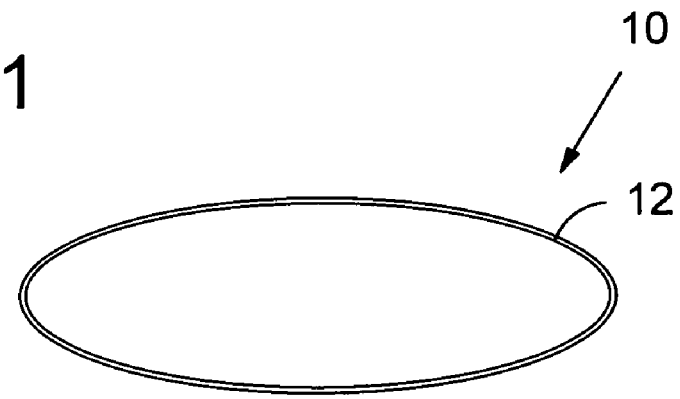
FIG. 1 is a schematic cross-sectional view of the preferred embodiment of the pipe.

As shown in FIG. 1, the preferred embodiment 10 of the pipe of the present invention has a non-circular cross section that generally looks like a squashed circle 12 that includes mathematically defined ellipsoids and ovals throughout its length. The cross section of the pipe does not deform significantly under the condition in which the pressure inside the pipe is the same or less than the internal pressure of the pipe that carries ordinary cold tap water. Under such a pressure, the pipe may be deformed (get rounder) slightly, but it is able to keep a non-circular cross section that generally looks like a squashed circle, and the pipe still has room to safely expand when it is frozen.

Figure 2:
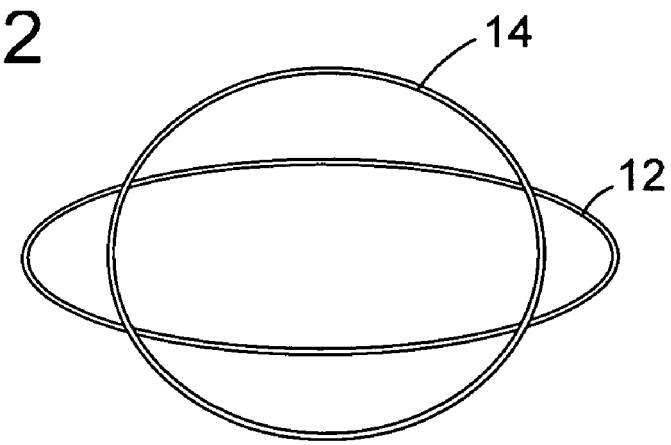
FIG. 2 shows schematic cross-sectional views of the preferred embodiment of the pipe, and the pipe that that has been deformed because of the increase in the volume when the water inside is frozen.
Figure 3A:
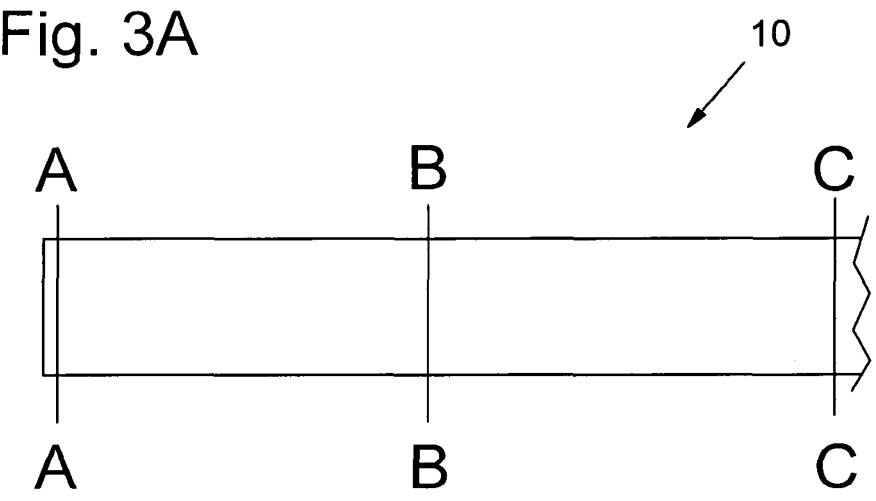
FIG. 3A a top view, and FIG. 3B cross-sectional views taken at three locations along its length of the preferred embodiment of the pipe of the present invention.
Figure 3B:
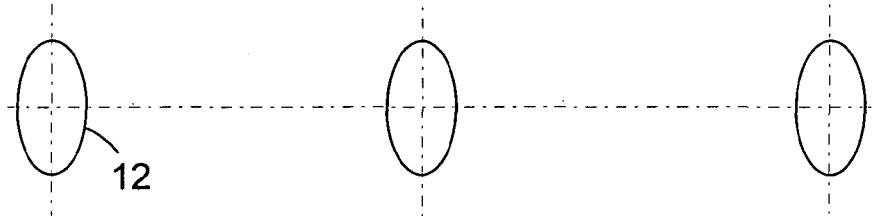

If the water in pipe is frozen, the squashed circle-like non-circular cross section 12 gets deformed and its cross section 14 becomes rounder and larger than the original cross section, and the larger cross section is large enough to contain the frozen water (or ice) without damaging the pipe (see FIG. 2). The pipe is made of a material such as high carbon content steel that allows the pipe to change back its pre-frozen shape (that having a generally squashed circle like non-circular cross section) from that having the rounder cross section as the water inside is thawed out.

Connection of two pipes of the preferred embodiment is made, for example, by welding, gluing or soldering together two facing ends of the two pipes. A coupler, which is generally a short pipe of the same design with a slightly larger cross section, may be used to reinforce the connection of the two pipe ends.

Figure 4A:
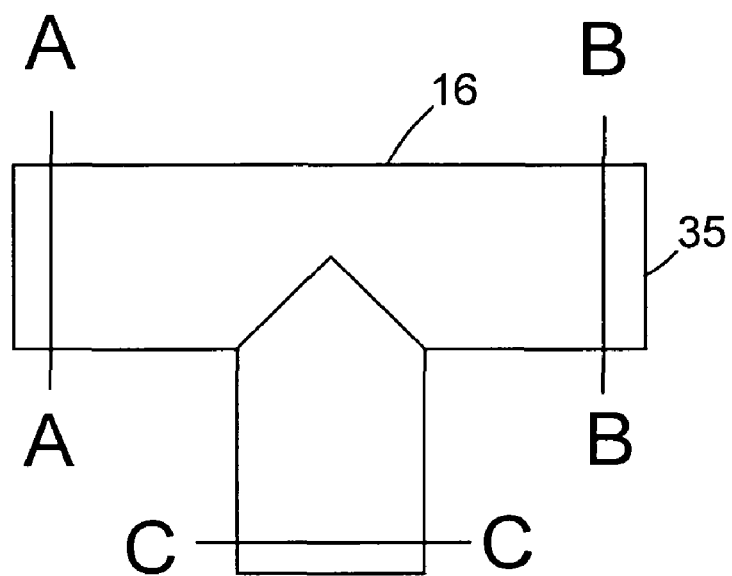
FIG. 4A is a top view, and FIG. 4B cross-sectional views taken at A-A, B-B, and C-C of FIG. 4A of a branch tree used with the preferred embodiment of the pipe of the present invention.
Figure 4B:
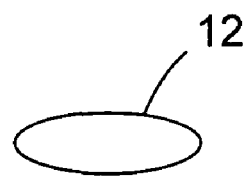

As shown in FIGS. 4A and 4B, a fitting called a branch tree 16, which probably is one of the most frequently used fittings other than aforementioned coupler in assembling a piping system also has the same squashed circle like non-circular cross section 12. The branch tree may be transformed to a functional equivalent of an elbow by capping one end 35.

Alternative Embodiment A

As shown in FIGS. 5A and 5B, the pipe of this alternative embodiment 18 comprises at least one end segment 19 that has a circular cross section 22 that is fitted with a female thread and to which end segment a fitting having a male thread is screwed in; the middle segment 23 with the squashed circle like non-circular cross section 12'; and a transition segment 25 between the circular cross section 22 and the middle section 23 with the non-circular cross section. Connection of the pipe end of the squashed circle like non-circular cross section with another pipe end with generally the same cross section design of the same size may be done by welding, gluing and soldering the facing ends with or without the aforementioned coupler.

Alternative Embodiment B

Figure 6A:
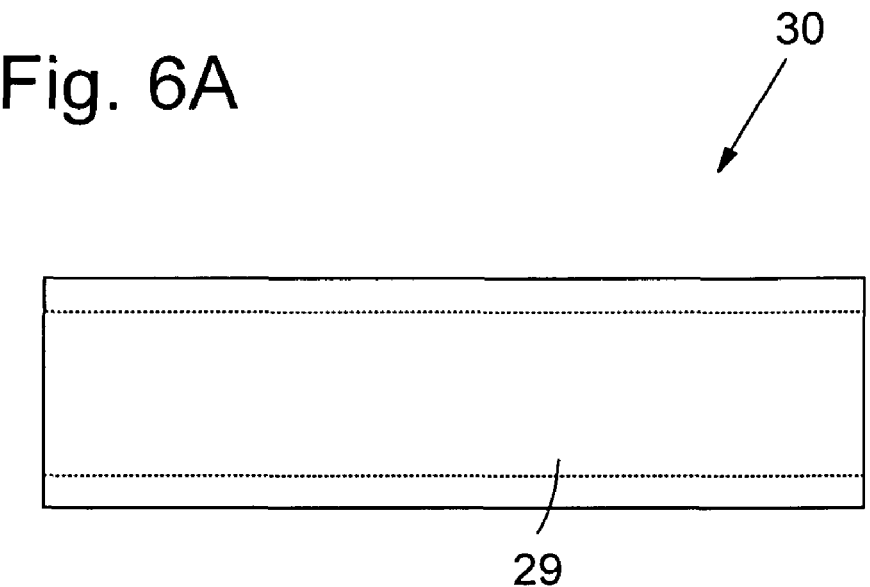
FIG. 6A is a top view, and FIG. 6B a cross-sectional view of Alternative Embodiment B of the pipe of the present invention.
Figure 6B:
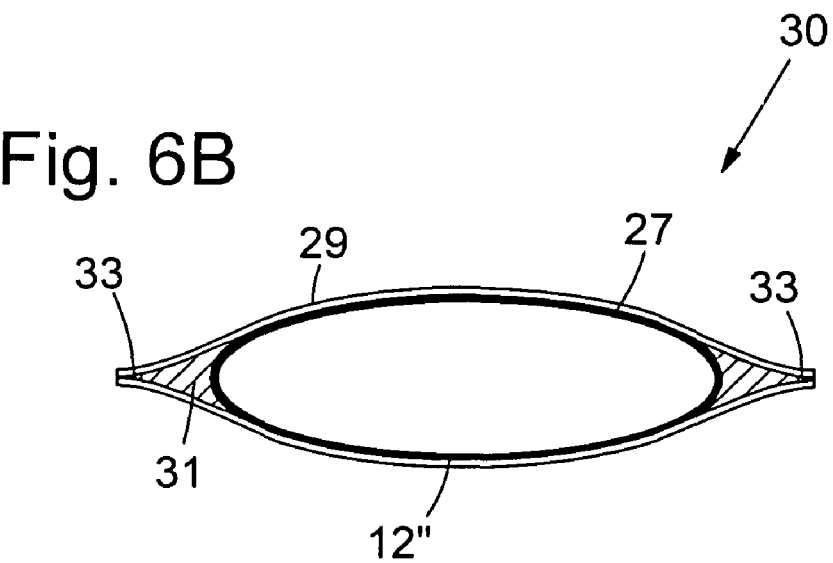

As shown in FIGS. 6A and 6B, this alternative embodiment 30 has a flexible inner tube 27 that has a squashed circle like non-circular cross section 12". The inner tube 27 made of an elastic material is sandwiched and contained by two laterally narrow curved plates 29 affixed together at the both lateral ends 33. Two spaces at the corners between the inner tube 27 and the two plates 29 are filled with an elastic material 31 that does not substantially increase its volume under sub zero centigrade weather condition. Connection of the two ends of the pipe of the alternative embodiment involves gluing, welding or soldering together of the two ends of the inner tubes 27, and riveting, welding, gluing or soldering together of the two ends of the outer curved plates 29. Couplers for the inner tube and the curved plates are also possible. An alternative design of Alternative Embodiment B has at least one end that has a circular cross section.

Figure 7A:
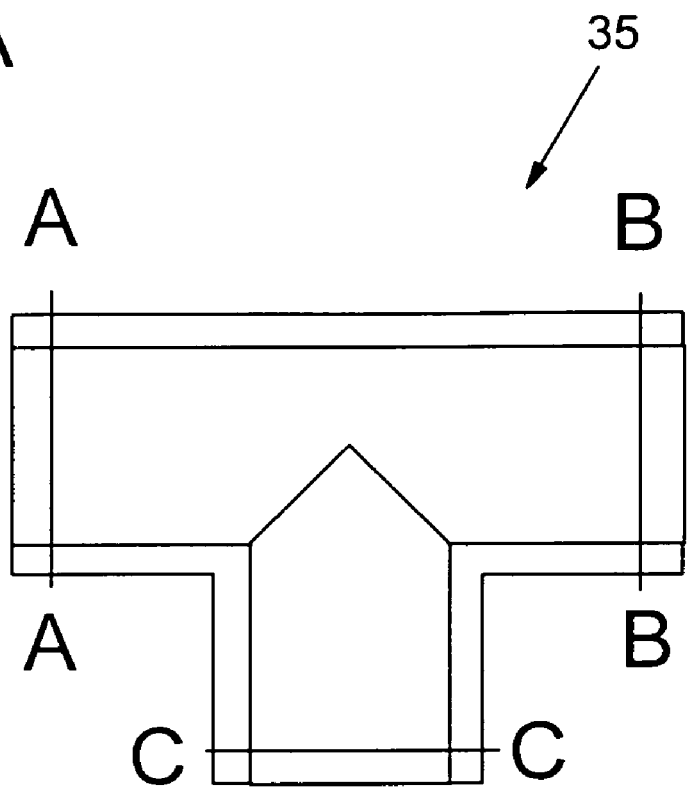
FIG. 7A is a top view, and FIG. 7B cross-sectional views taken along A-A, B-B, and C-C of FIG. 7A of a branch tree used with Alternative Embodiment B of the pipe of the present invention.
Figure 7B:
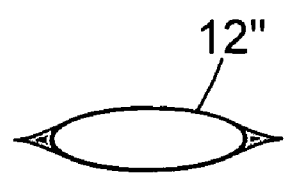

As shown in FIGS. 7A and 7B, a branch tree 35 used with the pipe of Alternative Embodiment B has the same cross section 12" as the pipe (used with the fitting) in all branches. A functional equivalent of an elbow may be made by capping one of the two branches shown by A-A and C-C in FIG. 7A.

Note that the substance carried by the pipe is not limited to water. The invention having been described in detail in accordance with the requirements of the U.S. Patent Statutes, various other changes and modifications will suggest themselves to those skilled in this art. It is intended that such changes and modifications shall fall within the spirit and scope of the invention defined in the appended claims.

I claim:

1. A pipe or tube comprising two end segments and a middle segment wherein said middle segment having a non-circular cross section that generally looks like a squashed circle that include mathematically defined ellipsoids and ovals,
    said middle segment of said pipe or tube does not deform significantly under the condition in which the pressure inside said pipe is the same or less than the internal pressure of a pipe that carries ordinary cold tap water,
    each of said two end segments of said pipe or tube has generally same cross section as said middle section of said pipe or tube,
    said pipe or tube gets deformed and said squashed circle like non-circular cross section becomes a rounder cross section with a larger area than the area of said squashed circle like non-circular cross section if the substance carried within said pipe is water and said water within said pipe is frozen, and
    two ends of said pipe or tube having a said squashed circle like non-circular cross section of same size can be connected together by a proper method including welding.

2. A pipe or tube comprising two end segments and a middle segment wherein said middle segment having a non-circular cross section that generally looks like a squashed circle that include mathematically defined ellipsoids and ovals,
    said middle segment of said pipe or tube does not deform significantly under the condition in which the pressure inside said pipe is the same or less than the internal pressure of a pipe that carries ordinary cold tap water,
    said pipe or tube has at least one end segment having a circular cross section, and
    two ends of said pipe or tube having a said squashed circle like non-circular cross section of same size can be connected together by a proper method including welding.

3. A fitting of a pipe or tube wherein said pipe or tube including two end segments and a middle segment
    wherein said middle segment having a non-circular cross section that generally looks like a squashed circle that includes mathematically defined ellipsoids and ovals,
    said middle segment of said pipe or tube does not deform significantly from said squashed circle cross section under the condition in which the pressure inside said pipe is the same or less than the pressure of the ordinary cold tap water,
    said fitting has at least two end segments, and
    said fitting is a branch tree wherein
    each of said branch having generally a slightly larger non-circular cross section as said pipe or tube does.

4. A fitting as defined in claim 3 wherein one end of said branch and said pipe or tube can be connected together by a proper method including welding.

5. A fitting as defined in claim 3 wherein at least one end segment of said fitting has a circular cross section.

6. A fitting as defined in claim 5 wherein one end segment of said fitting is capped.

7. A pipe or tube including a flexible inner tube having a squashed circle like non-circular cross section and two laterally narrow curved plates sandwiching said inner tube to contain said inner tube between said two curved plates wherein
    said two curved plates affixed together at both lateral ends.

8. A pipe or tube as defined in claim 7 wherein two pipes or tubes of said pipes or tubes are connected together by gluing said inner tube and welding said two curved plates.

9. A pipe or tube as defined in claim 7 wherein two pipes or tubes of said pipes or tubes are connected together by welding said inner tube and welding said two curved plates.

10. A pipe or tube as defined in claim 7 wherein two pipes or tubes of said pipes or tubes are connected together by soldering said inner tube and welding said two curved plates.

11. A pipe or tube as defined in claim 7 wherein said two curved plates creating two inner corner spaces between said inner tube and said two curved plates, and
    said two inner corner spaces between said inner tube and said two plates are filled with an elastic material that does not increase volume substantially under sub zero centigrade condition.

* * * * *

UNITED STATES PATENT AND TRADEMARK OFFICE
CERTIFICATE OF CORRECTION

PATENT NO. : 8,235,074 B2
APPLICATION NO. : 12/660366
DATED : August 7, 2012
INVENTOR(S) : Masami Sakita It is certified that error appears in the above-identified patent and that said Letters Patent is hereby corrected as shown below:

Title Page: Item 54 and Col. 1, Line 1, the title of the patent as published:

POPE AND PIPE FITTINGS

The correct title should be:

PIPE AND PIPE FITTINGS

Signed and Sealed this
Twenty-third Day of October, 2012

David J. Kappos
*Director of the United States Patent and Trademark Office*